July 11, 1961 D. D. PEEBLES 2,992,141

CRYSTAL SEPARATING PROCESS

Filed June 2, 1958

INVENTOR.
David D. Peebles
BY Flehr & Swain
ATTORNEYS

United States Patent Office 2,992,141

Patented July 11, 1961

2,992,141
CRYSTAL SEPARATING PROCESS

David D. Peebles, Davis, Calif., assignor to Foremost Dairies, Inc., San Francisco, Calif., a corporation of New York Filed June 2, 1958, Ser. No. 739,309
17 Claims. (Cl. 127—61)

This invention relates generally to processes and apparatus for removing solids from fluid mixtures. Particularly it has been applied to the removal of lactose from liquid whey.

Liquid whey, such as is produced as a by-product in the manufacture of cheese, has a lactose content of the order of 67% (dry solids basis). A number of commercial processes have been used for the manufacture of lactose from such raw material. In one such process a portion of the protein of the whey is coagulated by addition of lime and application of heat, after which the coagulated solids together with precipitated calcium phosphate and other insoluble solids, are removed by decantation, filtration, or centrifugation. The clarified effluent is then concentrated by evaporation, and lactose is crystallized from the concentrate. The crystallized lactose is then removed from the mother liquor as by centrifuging, and further purified as by washing, by resolution and recrystallization, or both. It will be apparent that such a process seriously impairs or destroys the protein constituents of the whey solids. Furthermore, a substantial amount of solids from the whey are associated with the removed lactose crystals, thus requiring extensive washing or other treatment for purification.

Another commercial process (see Patent 2,439,612) involves concentrating liquid whey by vacuum evaporation together with heat treatment, after which lactose is crystallized from the concentrate. Lactose crystals are removed from the material as by centrifuging or hydraulic separation. A modification of the last described process (see Patent 2,768,912) involves treatment of the crystallized concentrate in a rotating screen equipment, for removing the lactose crystals. The lactose crystals must be relatively large for effective removal. Both of the last described processes, in contrast with the subject invention, involve removal of the lactose crystals with substantial amounts of other solids of the whey, thus complicating subsequent purification procedures.

In general, it is an object of the present invention to provide a process utilizing a novel procedure for the removal of lactose crystals from a liquid medium.

Another object of the invention is to provide a process which is more economical than prior processes, and which provides an effluent that can be spray dried to form a powdered product.

Another object of the invention is to provide a process capable of continuous operation for the removal of lactose crystals.

Another object of the invention is to provide a process of the above character which removes the lactose crystals together with only a relatively small amount of other whey solids, thus simplifying subsequent washing or other purification procedures.

Another object of the invention is to provide a process of the above character which can be applied to a variety of materials having comparable characteristics.

Another object of the invention is to provide novel apparatus for carrying out the foregoing process.

Additional objects and features of the invention will appear from the following description in which the preferred embodiments have been set forth in detail in conjunction with the accompanying drawing.

Referring to the drawing.

Figures 1, 2, 3:
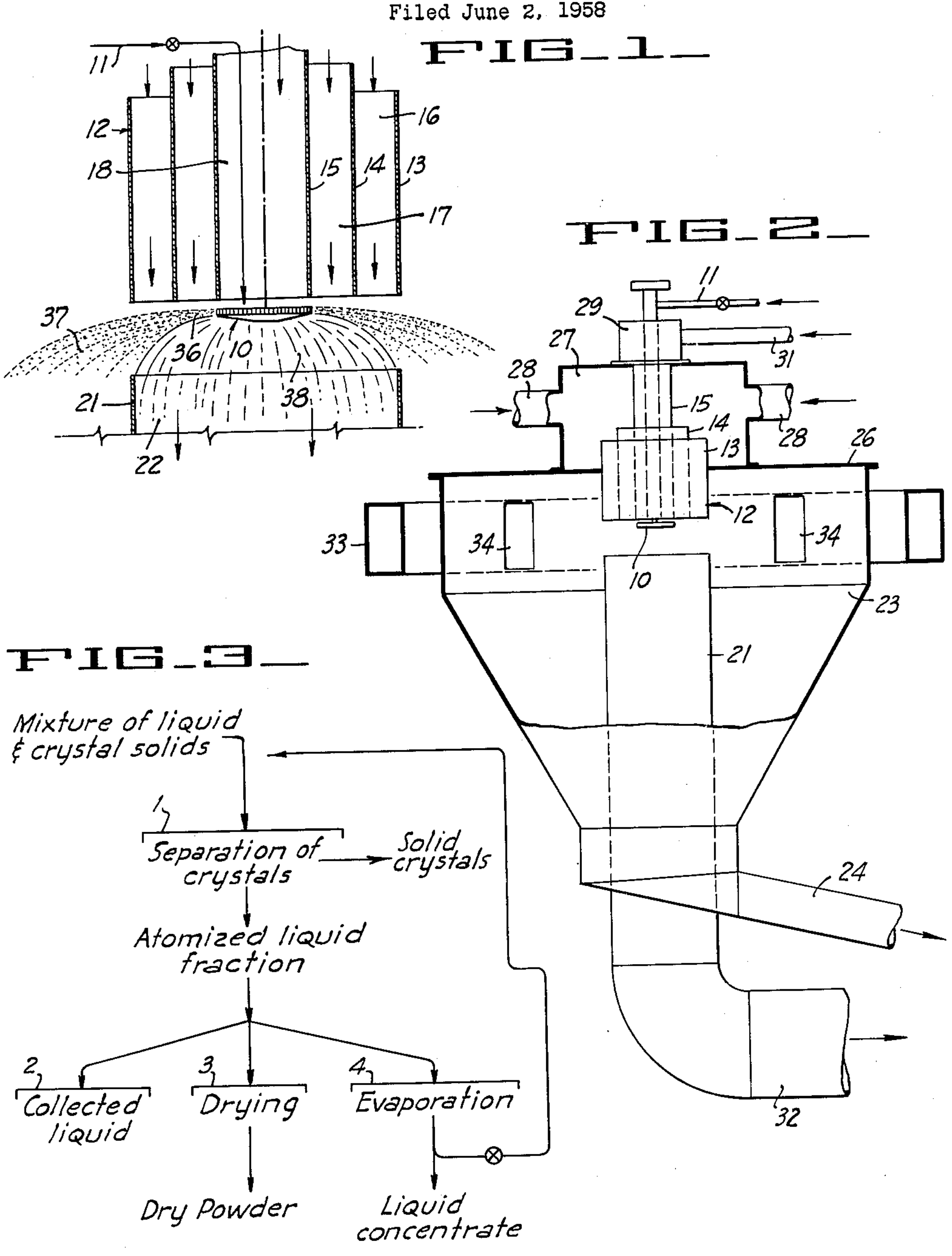
FIGURE 1 is a schematic view in side elevation illustrating essential parts of the apparatus and the manner in which the process is carried out.
FIGURE 2 is a side elevational view in section illustrating a more complete apparatus for carrying out the present process.
FIGURE 3 is a flow sheet illustrating the process.

Referring particularly to the removal of lactose from whey, the present invention involves producing a whey concentrate containing a substantial amount of crystalline lactose in the form of discrete solids. In practice, the lactose crystals can be formed by first concentrating raw liquid whey, as by vacuum evaporation, to produce a concentrate supersaturated with respect to its lactose content, and then subjecting such concentrate to controlled crystallization to produce lactose crystals of a size suitable for the present process. This mixture is then subjected to atomization, with the material resulting from atomization being discharged through a treatment zone. The material passing through the treatment zone consists of liquid droplets and lactose crystals forming the solid fraction, with both the droplets and the solids moving at relatively high speeds in free flight. Separating forces are applied to the material moving through the treatment zone, whereby separation and orientation takes place between the crystal solids and the liquid droplets. The separated fractions are then collected from the regions into which they are discharged.

The apparatus schematically illustrated in FIGURE 1 consists of a centrifugal atomizer head 10. This device can be similar to devices commonly used in the milk industry in connection with spray drying equipment. A feed line 11 is shown for introducing material into the atomizer. Conduit means is provided for delivering a current of air or other gas toward one side of the annular region surrounding the atomizer. This conduit means can consist of the concentric conduits 13, 14 and 15, which form between them the annular passages 16 and 17. The inner conduit 15 also forms a passage 18 terminating immediately above the head. On the other side of the atomizer head, the conduit or shell 21 forms a passage 22 which is alined with and generally opposed to the passages 16 and 17.

In FIGURE 2, the parts illustrated schematically in FIGURE 1, are incorporated in more complete equipment. The conduit means 12 and 21 are disposed within the chamber 23, which has a lower conical portion in communication with the exhaust conduit 24. Conduit means 12 extends through the top wall 26 of the chamber 23, whereby the passages 16 and 17 communicate with the chamber 27. Gas is delivered to chamber 27 and thus to the passages 16 and 17, by way of conduits 28. Another chamber 29 communicates with the upper end of passage 18, and connects with conduit 31 whereby air or other gas is supplied to a region closely adjacent one side of the atomizer head, as shown in FIGURE 1. The inner conduit means 21 connects with the external conduit 32. A manifold 33 is shown surrounding the chamber 23, and is connected with chamber openings 34 for introduction of air or other gas.

The atomizer head 10 should be capable of producing relatively uniform atomization of viscous concentrates. Good results in the separation of lactose have been obtained by using a head of the circumferentially spaced impact bar type wherein bars are disposed in circumferentially spaced arrangement at the outer periphery of a hollow rotating head. Atomizer heads of this type are disclosed in Patent 1,939,364.

Typical use of the apparatus shown in FIGURE 2 involves connecting conduit 32 with the suction side of a blower, through a separator of the cyclone type. Conduit 24 can likewise be connected to the suction side of a blower, through a separating cyclone. A controlled amount of air is admitted through the conduits 28 to flow downwardly through passages 16 and 17. A limited amount of air is introduced by way of conduit 13 and passage 18, to minimize back swirl of the atomized material inwardly over the atomizer head. A controlled amount of air is shown being introduced through the openings 34 to cause swirling movement of air within the chamber 23, with this air progressing inwardly and ultimately downwardly through the conduit 24. Use of this feature tends to increase the efficiency of crystal separation.

As previously stated, the invention has been used successfully for the separation of alpha monohydrate lactose crystals from a whey concentrate. Such a mixture can be prepared by subjecting a suitable raw liquid whey to vacuum evaporation to produce a concentrate which, for example, may range from 40 to 55% solids. At normal temperatures, such concentrates are supersaturated with respect to their lactose content. Lactose can be crystallized from such a concentrate by known methods, involving for example seeding of the concentrate with lactose crystals together with gradual cooling and agitation over an extended period. In typical instances from 50 to 75% of the lactose content may be crystallized, with the major portion of the crystal particles ranging from about 105 to 840 microns in size. Assuming that such a whey concentrate is supplied to the atomizer head 10, centrifugal atomization takes place with discharge of material outwardly from the periphery of the rotating head in a generally planar annular zone. In FIGURE 1 this zone is indicated at 36. Gas discharging from the passages 16 and 17 forms a relatively non-turbulent stream directed toward one side of the zone 36, and in this manner separating forces are applied. Without theorizing upon the exact manner in which separation takes place, the net result is to cause deflection and orientation of liquid droplets downwardly, while the lactose solids become disengaged from the liquid droplets and continue outwardly on a more elevated trajectory. In FIGURE 1, the region 37 is occupied substantially entirely by lactose crystals, while the region 38 overlying the open end of the conduit 21 is occupied by atomized liquid droplets. Between these two regions, there is a transitional region, which however is relatively sharply defined. The downward current of gas through the conduit 21 plays a part in deflecting the material being discharged from the atomizer, and the process is carried out in such a manner that substantially all of the atomized liquid droplets are drawn downwardly into the conduit 21, whereby the lactose crystals proceed beyond the conduit 21, and into the lower portion of the chamber 23, for withdrawal through the conduit 24. Air introduced through openings 34 swirls about the chamber 23 and also enters conduit 21 over its upper edge. This serves to increase the sharpness and efficiency of separation.

It is a relatively simple matter to adjust the process and apparatus to obtain the desired separation. Thus water can be supplied to the atomizer head, and the rate of flow through the passages 16 and 17 and the conduit 21 adjusted whereby practically all of the liquid droplets are drawn into the conduit 21 instead of being discharged into the chamber 23. The region occupied by the liquid droplets, adjacent the open end of the conduit 21, should be of a diameter only slightly less than the internal conduit diameter. Small amounts of air are admitted through conduit 18 to prevent back swirl. Substantial amounts of air, as for example about one-half of the total air supplied, is introduced through openings 34. If now the concentrate containing the lactose crystals is supplied to the atomizer, separation takes place as previously described, with substantially all of the liquid droplets being drawn into the conduit 21.

Lactose in solution, and the smaller lactose crystals (e.g. less than about 105 microns) remain with the liquid droplets. In general, the separated lactose may comprise from 40 to 70% of the total lactose of the whey, and from 70 to 95% or more of the crystallized lactose.

In some instances it is desirable to use the process primarily for the purpose of separating lactose crystals from the mother liquor. In such event, air or other gas at room temperatures can be supplied to the equipment. I have discovered, however, that further concentration or spray drying can be carried out simultaneously with the separating operation. Thus assuming that it is desired to remove a portion of the moisture contained in the liquid separated fraction, the air supplied by way of conduits 28 and 33 is heated, whereby the liquid droplets are dispersed in drying air, thus removing moisture by evaporation. By controlling the inlet and outlet temperatures of the drying air, the amount of evaporation can be controlled as desired, whereby the material delivered to conduit 21 is either a concentrate, or a dry powdered material.

Irrespective of whether the evaporation of the liquid fraction takes place simultaneously with crystal separation, the material collected and removed through conduit 24 has very little moisture content, and is relatively free of impurities. Assuming the separation of lactose in the manner previously described with air at room temperature, the free moisture content of the separated lactose may be reduced to below approximately 10%, and the residual whey solids (other than lactose) may contain from 35 to 50% solids. By relatively simple secondary drying, the free moisture content of the lactose fraction can be reduced to a value of approximately 3% or less. Such secondary drying can be carried out for example by passing the material through one or more cyclones supplied with hot air. Also some secondary drying can be carried out by elevating the temperature of the air introduced through openings 34. The relatively low percentage of impurities with the lactose crystals makes it possible to use such a product for many purposes, without further processing. However, it can be readily processed by known methods, as for example by washing, dissolution and reprecipitation, or both, to produce a lactose of the desired purity.

The flow sheet of FIGURE 3 illustrates a continuous process for the removal of a crystal solid-like lactose. In this instance a mixture of liquid and crystal solids, such as a whey concentrate containing alpha lactose monohydrate crystals, is supplied to the separating operation 1, carried out in the manner previously described. The atomized liquid fraction is shown either being collected as a liquid at 2, being subjected to drying at 3 to produce a spray dried powder, or to partial evaporation at 4 to produce a liquid concentrate. Some such liquid concentrate may be recycled as indicated.

Examples of my process are as follows:

*Example 1*

An edible grade of raw liquid whey was concentrated by vacuum evaporation to produce a concentrate containing 55% solids. This concentrate was removed from the last evaporating stage at a temperature of 140° F. The concentrate was seeded with lactose crystals and gradually cooled over a period of about 48 hours with gentle agitation. Substantially 70% of the lactose content crystallized as alpha lactose monohydrate, and the bulk of the crystals were of a size ranging from 105 to 840 microns. This concentrate was fed to apparatus as described in connection with FIGURES 1 and 2, with air being supplied at normal room temperature. Both conduits 13 and 21 had internal diameters of about 36 inches. The centrifugal atomizer head had an external diameter of 10 inches and circumferentially spaced impact bars. It was located about 12 inches from conduit 21. The atomizer head and the speed of rotation (about 1500 r.p.m.), were such that if used as an ordinary spray drier for producing spray dried skim milk solids, the dried particles would have a size of the order of about 50 microns. Air was exhausted through conduit 12 at a velocity of about 15 feet per second. About 40% of the total air admitted was through passages 16 and 17, about 10% through passage 18, and about 50% through openings 34. In accordance with my observations and calculations, the liquid droplets being discharged from the atomizer head had an average size of the order of 10 to 150 microns, or in other words, they were smaller than the lactose crystals to be separated. Lactose crystals removed by way of conduit 24 analyzed as follows:

| | Percent |
|---|---|
| Alpha lactose monohydrate | 96 |
| Other solids | 3 |
| Free moisture | 1 |

The separated lactose fraction was a free-flowing material. Of the total amount of lactose in the concentrate, 65% was separated out and delivered to conduit 24. With respect to the lactose contained in the collected liquid droplets about 95% of the same was in the form of lactose crystals smaller than about 105 microns.

*Example 2*

The process was carried out in the same manner described above, but hot air at a temperature of about 320° F. was admitted to the conduits 28 and 33, and the rate of feed of the concentrate was reduced to produce an air outlet temperature through conduit 32 of about 180° F. Under such conditions, the liquid fraction was dried to form a dry powdered edible product, similar to ordinary commercial spray dried whey, except for its lactose content.

While the invention has been described as employed for the separation of lactose crystals from a whey concentrate, it is deemed to be applicable to separating operations on other material having comparable characteristics.

In the foregoing explanation, reference is made to the application of separating forces by virtue of the relatively non-turbulent current of air delivered through conduit passages 16 and 17 and directed toward zone 36. The current of air applies separating forces because it deflects the liquid droplets to an extent greater than deflection of the crystal solids. In addition to separating forces created by virtue of the air current, it is deemed probable that other forces exist tending to cause effective separation. For example, it is probable that the non-spherical crystal solids are discharged with considerable rotation or spin about their individual axes, which tends to free them from liquid. In addition, any liquid droplets containing or incorporating crystal solids of substantial size tend, by virtue of the presence of a crystal, to subdivide and thus free the liquid from the crystal. This freeing action may be aided by surface and interfacial tension effects. During the separating operation a crystal may be reduced in size by breakage, depending upon such factors as crystal size and hardness and the speed of rotation of the atomizer head. Whether all or only some of the above described factors are responsible, separation in accordance with my process is remarkably effective, and makes possible relatively high capacity continuous separating operations.

In general, the present process provides a simple procedure for the continuous removal of crystal solids. The process is more economical than prior processes, and is flexible in that it can be adapted to a wide variety of requirements and conditions.

I claim:

1. In a separating process for the treatment of a hydrous fluid mixture containing discrete solid particles and liquid fractions, the steps of subjecting the mixture to centrifugal atomization whereby droplets of the liquid fraction and the discrete solid particles are discharged outwardly through an annular treatment zone surrounding the region of atomization, the discrete solid particles containing less than about 10% free moisture, subjecting the material while in flight through said zone to a flow of gas to apply additional separating forces to thereby effect a substantial separation of the droplets from the discrete solid particles, and then separately collecting the fractions leaving said zone, one fraction being a non-fluid mass comprising mainly the discrete solid particles.

2. A process as in claim 1 in which the additional separating forces are applied by subjecting the material in said separating zone to a stream of gas directed generally at right angles to the direction of flight of material in said zone.

3. In a separating process for the treatment of a hydrous fluid mixture containing a liquid fraction and lactose crystals, atomizing the mixture and discharing the resulting material through a zone of separation, the discharging material comprising liquid droplets and discrete lactose crystals containing less than about 10% free moisture, subjecting the material while in said zone to a flow of gas to apply separating forces, and then collecting the separated discrete lactose crystals leaving said zone.

4. A process as in claim 3 in which said zone is annular and generally planar.

5. A process as in claim 3 in which a current of gas is directed toward and through said zone from one side thereof to thereby apply separating forces.

6. In a process for the removal of lactose from an aqueous liquid lacteal material containing the same, the steps of forming a concentrate of the material with a portion of its lactose in a condition of supersaturation, crystallizing lactose in the concentrate to provide crystal particles ranging generally from about 105 to 840 microns in size, subjecting the concentrate to atomization whereby atomized droplets and lactose crystals are discharged through a zone adjacent the region of atomization, directing a stream of gas toward and through said zone from one side thereof to thereby cause separation between solid lactose crystals and liquid droplets, the separated lactose crystals containing less than about 10% free moisture, and then collecting the separated lactose crystals.

7. A process as in claim 6 in which said stream of gas is hot drying gas whereby moisture is evaporated from the liquid droplets.

8. A process as in claim 7 in which the hot drying gas effects removal of moisture from the liquid droplets to form a dry powdered material.

9. In a separating process for the treatment of a hydrous fluid mixture containing discrete solid and liquid fractions, atomizing the mixture to form atomized droplets of liquid material and discrete solid particles containing less than about 10% free moisture, discharging the resulting material in free flight through a zone of separation, subjecting the material while in said zone to a flow of gas to apply separating forces to thereby effect a substantial orientation of liquid droplets relative to the discrete solids, causing the separated liquid fraction to be dispersed in a hot drying gas whereby moisture is removed from the same by evaporation, and separately collecting the discrete solids from the other material.

10. A process as in claim 9 in which moisture is removed from the liquid droplets by evaporation to produce a liquid concentrate.

11. A process as in claim 9 in which moisture is removed from the liquid droplets while dispersed in said drying gas to produce a dry powdered material.

12. In a process for the treatment of a fluid material containing discrete solid and liquid fractions, atomizing the material and discharging the resulting material in free flight through an annular zone of separation, said zone being generally planar, directing a current of hot drying gas toward and through said zone from one side thereof to thereby apply separating forces to effect a substantial orientation of liquid droplets relative to the solids and to effect dispersion of the liquid droplets in said gas to thereby remove moisture from the same by evaporation, and then collecting the solids separately from the other material leaving said zone.

13. In a separating process for the treatment of a fluid mixture containing lactose crystals and an aqueous liquid fraction, subjecting the mixture to atomizing forces whereby the material is discharged as atomized droplets together with discrete solid lactose crystals containing less than about 10% free moisture, said discharge being through an annular zone that is generally planar, directing a current of hot drying air toward said zone from one side thereof whereby the lactose crystals and droplets in said zone are subjected to forces to thereby effect a substantial orientation of the droplets relative to the lactose crystals and whereby moisture is evaporated from the liquid droplets, collecting the lactose crystals discharging outwardly from said zone, and separately removing material from a region on the other side of said zone.

14. In a process for the removal of a crystallizable substance from an aqueous liquid material containing the same, the steps of forming a concentrate of the material with a portion of said substance in a condition of supersaturation, crystallizing solid particles of the substance in the concentrate to provide crystal particles ranging generally from 105 to 840 microns in size, subjecting the concentrate to atomization whereby atomized droplets and crystal solids containing less than about 10% free moisture are discharged through a zone surrounding the region of atomization, directing a current of gas toward and through said zone to effect separation between said crystal solids and liquid droplets, and collecting the crystal solids separated from the remaining material.

15. In a process for the treatment of a fluid mixture containing a liquid fraction and discrete solids, atomizing the mixture and discharging the resulting material through an annular zone of separation, directing a stream of gas toward and through said zone from one side thereof, withdrawing gas in a region on the other side of said zone together with atomized liquid droplets, collecting discrete solids discharged into another region generally surrounding the first region, continuously supplying additional gas into said last named region, and causing the additional gas to flow into said last named region at that end of the same that is adjacent said zone.

16. A process as in claim 15 in which the additional gas is caused to swirl about said first named region.

17. A process as in claim 16 in which both the gas directed toward said zone and the additional gas are hot drying gases.

References Cited in the file of this patent

UNITED STATES PATENTS

| | | |
|---|---|---|
| 2,088,606 | Peebles et al. | Aug. 3, 1937 |
| 2,461,584 | Anderson | Feb. 10, 1949 |
| 2,525,224 | Kaiser | Oct. 10, 1950 |
| 2,555,213 | Wallace | May 29, 1951 |
| 2,575,119 | Peebles et al. | Nov. 13, 1951 |
| 2,559,989 | Nyrup | July 10, 1951 |
| 2,566,292 | Reese | Aug. 28, 1951 |
| 2,768,912 | Peebles et al. | Oct. 30, 1956 |